(12) United States Patent
Jonsson et al.

(10) Patent No.: US 8,400,793 B2
(45) Date of Patent: Mar. 19, 2013

(54) METHOD IN A CASCADED TWO-LEVEL CONVERTER, CONTROL DEVICE AND COMPUTER PROGRAM PRODUCTS

(75) Inventors: Tomas Jonsson, Västerås (SE); Lennart Harnefors, Eskilstuna (SE)

(73) Assignee: ABB Research Ltd., Zurich (CH)

( * ) Notice: Subject to any disclaimer, the term of this patent is extended or adjusted under 35 U.S.C. 154(b) by 56 days.

(21) Appl. No.: 13/145,161

(22) PCT Filed: Feb. 11, 2009

(86) PCT No.: PCT/EP2009/051522
§ 371 (c)(1),
(2), (4) Date: Jul. 19, 2011

(87) PCT Pub. No.: WO2010/091720
PCT Pub. Date: Aug. 19, 2010

(65) Prior Publication Data
US 2011/0273915 A1    Nov. 10, 2011

(51) Int. Cl.
*H02M 1/12* (2006.01)
(52) U.S. Cl. .............................. 363/44; 363/45; 363/67
(58) Field of Classification Search ............. 363/44, 363/45, 46, 52, 53, 65, 67, 125, 126, 127
See application file for complete search history.

(56) References Cited

U.S. PATENT DOCUMENTS

| | | |
|---|---|---|
| 2002/0172058 A1 | 11/2002 | Szczesny et al. |
| 2008/0007973 A1* | 1/2008 | Schreiber .......................... 363/2 |
| 2008/0218320 A1* | 9/2008 | Jang ........................ 340/310.12 |
| 2008/0304296 A1* | 12/2008 | NadimpalliRaju et al. ..... 363/45 |
| 2010/0118578 A1 | 5/2010 | Dommaschk et al. |

FOREIGN PATENT DOCUMENTS

| | | |
|---|---|---|
| EP | 1 717 941 A2 | 11/2006 |
| WO | WO 2008/067785 A1 | 6/2008 |

OTHER PUBLICATIONS

Kouro et al., "Multicarrier PWM With DC-Link Ripple Feedforward Compensation for Multilevel Inverters", IEEE Transactions on Power Electronics, IEEE Service Center, Piscataway, NJ, US, vol. 23, No. 1, Jan. 1, 2008, pp. 52-59.

* cited by examiner

*Primary Examiner* — Nguyen Tran
(74) *Attorney, Agent, or Firm* — Birch, Stewart, Kolasch & Birch, LLP

(57) ABSTRACT

A method for providing a switching order signal to a cell of a cascaded two-level converter is provided. The cell includes a capacitor parallel-connected with two series-connected semiconductor devices. The cascaded two-level converter includes two or more of the cells cascade connected and arranged in a phase, divided into two phase arms, between a first pole and a second pole of a direct voltage side. The method includes measuring voltages of the capacitor of the cell; calculating a compensated voltage reference based on a voltage reference and the measured voltages of the capacitors, wherein the voltage reference corresponds to a desired ac current to be output on an ac-side; using the compensated voltage reference to calculate a switching order signal, and providing the switching order signal to the cells.

11 Claims, 3 Drawing Sheets

METHOD IN A CASCADED TWO-LEVEL CONVERTER, CONTROL DEVICE AND COMPUTER PROGRAM PRODUCTS

FIELD OF THE INVENTION

The invention relates generally to the field of power converters, and in particular to methods and means for controlling switching instants of semiconductor devices of the power converter.

BACKGROUND OF THE INVENTION

A power converter is a device fit for many applications in a power network, used for rectification where electric power flows from an ac (alternating current) side to a dc (direct current) side and for inversion where the power flows from the dc side to the ac side. The power converter may be used in various applications, for example as interconnection between asynchronous systems, for power flow control or for increasing the capacity of existing ac transmission by conversion to dc transmission.

A multilevel converter using a cascade configuration is based on serially connected multiple single-phase cells to each ac phase, wherein the cells comprise semiconductor switches. The multilevel converter having such configuration is in the following denoted cascaded two-level converter, and it can be built using a structure based on such series-connected cells, each cell comprising a capacitor and a pair of semiconductor switches of turn-off type series-connected.

A control device controls the turning off and on of the semiconductor switches in the cells of the cascaded two-level converter, based on measurements of e.g. the voltage on the dc side and a desired reference voltage. The control of the cells in one phase of the cascaded two-level converter is primarily based on the objective to define the switching instants in order to realize a desired fundamental frequency output voltage based on a voltage reference given by an ac current control function.

In order to minimize harmonic interaction between the cascaded two-level converter and the ac-side, which for example could be a three-phase power network grid, it is desirable to define the current control function so as to make the cascaded two-level converter appear as a voltage source behind an inductance. FIG. 1 illustrates an equivalent circuit for the cascaded two-level converter, wherein the equivalent inductance of the cascaded two-level converter equals half of the valve inductance, $L_v/2$. In the figure, $U_v$ denotes the equivalent ideal voltage source and $I_v$ denotes the corresponding current. $I_{pcc}$ illustrates the current at the point of common coupling between the dc side and the ac side. Ideally, $I_{pcc}$ equals $I_v$.

The capacitors of the cells of the cascaded two-level converter are not infinitely large and a ripple voltage will therefore appear when exposed to the fundamental frequency current in combination with the switching action.

The ripple on the cell capacitors will in turn result in that the output voltage on the ac-side will differ from the voltage reference which means that the equivalent inductance of the cascaded multilevel converter is not equal to $L_v/2$.

SUMMARY OF THE INVENTION

In view of the above, it is an object of the present invention to overcome or at least alleviate the above-described problems of ripple voltage.

It is a particular object of the invention to provide means for eliminating ripple voltage, and particularly fundamental frequency ripple voltage, caused by non-ideal capacitors of a converter.

It is another object of the invention to provide means for improving the current control function making the cascaded two-level converter truly appear as a voltage source behind an inductance.

It is still another object of the invention to provide means for minimizing or even eliminating harmonic interaction, particularly low-order harmonic interaction, between the cascaded two-level converter and the ac-side.

In accordance with the invention, a method for providing a switching order signal to a cell of a cascaded two-level converter is provided. The cascaded two-level converter is arranged to convert between alternating current and direct current. The cell comprises a capacitor parallel-connected with two series-connected semiconductor devices, which each in turn comprises at least one respective transistor with an anti-parallel connected diode. The cascaded two-level converter comprises two or more of the cells cascade connected and arranged in a phase between a first pole and a second pole of a direct voltage side. The phase is divided into two phase arms, wherein a first phase arm is connected between the first pole and an ac phase output, and a second phase arm is arranged between the ac phase output and the second pole. The method is characterized by the steps of: measuring voltages of the capacitors of the at least two cells; calculating a compensated voltage reference based on a voltage reference and the measured voltages of the capacitors, wherein the voltage reference corresponds to a desired ac current to be output on an ac-side; using the compensated voltage reference to calculate a switching order signal for said cell and providing the switching order signal to said cell. By means of the invention an improved current control function is provided, wherein the harmonic interaction, particularly low-order harmonic interaction, between the cascaded two-level converter and the ac-side is minimized or even eliminated. The current control function is closer to the desired one making the cascaded two-level converter appear as a voltage source behind an inductance. Further, the output ac voltage is free from ripple voltage and equals the desired voltage reference.

In accordance with an embodiment of the invention, the step of calculating a compensated voltage reference comprises calculating the sum of the cell capacitor voltages of the first and second phase arms. The inventors of the present invention have found that compensating the reference voltage with the sum of the cell capacitor voltages provides an excellent way of eliminating the undesired ripple voltage.

In accordance with another embodiment of the invention, the step of calculating a compensated voltage reference comprises utilizing the following particular equation:

$$r = \frac{u_v^{ref} + (u_{cp} - u_{cn})/4}{(u_{cp} + u_{cn})/4},$$

where r is the compensated voltage reference, $u_v^{ref}$ is the voltage reference, $u_{cp}$ is the sum of the cell capacitor voltages of the first phase arm and $u_{cn}$ is the sum of the cell capacitor voltages of the second phase arm.

The equation has been shown to eliminate at least the fundamental frequency ripple voltage in an excellent way. The equation, comprising only simple summations, subtractions and divisions, may further easily be implemented in software products.

In accordance with yet another embodiment, the step of calculating the switching order signal is based on pulse-width modulation using a carrier wave signal. The carrier wave signal is then preferably chosen so as to reflect actual network conditions. An easily implemented way of providing the switching order signal is thus provided, enabling the use of any known pulse-width modulation method.

The invention also relates to a control device for controlling a cascaded two-level converter and to computer program products, whereby advantages corresponding to the above are achieved.

Further features of the invention and advantages thereof will become clear upon reading the following detailed description with the accompanying figures.

DETAILED DESCRIPTION OF EMBODIMENTS OF THE INVENTION

Figure 1:
FIG. 1 illustrates an equivalent circuit for a cascaded two-level converter.

In the following description, the same reference numerals will be used throughout the figures for denoting same or corresponding parts.

Figure 2:
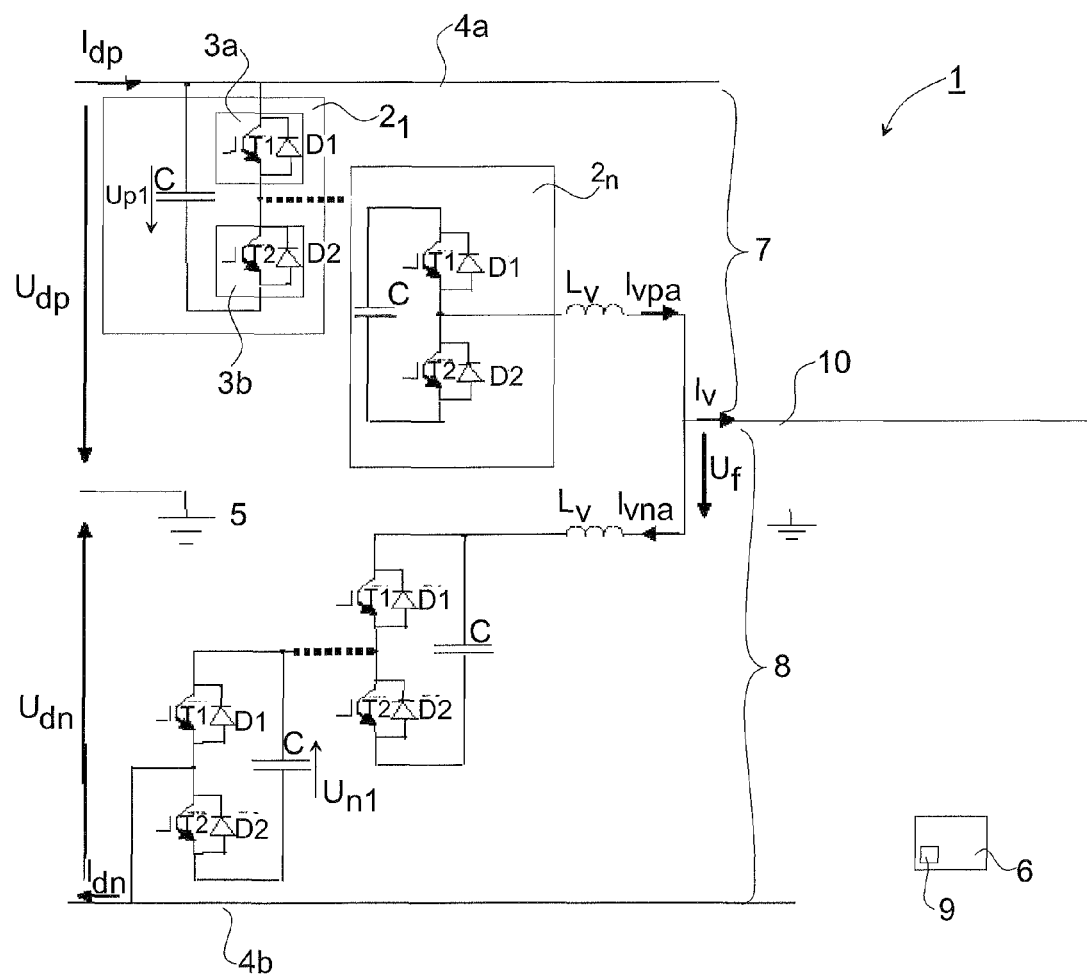
FIG. 2 illustrates one phase of a cascaded two-level converter.

FIG. 2 illustrates one phase of a cascaded two-level converter, which in the following will be denoted simply converter. The converter 1 is arranged to convert between alternating current and direct current. In the figure, only part of the converter 1 being connected to one phase of an ac-side is illustrated. The phase is arranged on a direct voltage side of the converter 1, and in particular connected at one end to a positive busbar 4a and at another end to a negative busbar 4b, in the following denoted positive pole 4a and negative pole 4b, respectively. More generally, the poles 4a, 4b are simply a first and a second pole, but are in the following exemplified by a positive and a negative pole, respectively.

The illustrated phase of the converter 1 can be seen as comprising an upper and a lower phase arm, 7 and 8, respectively. The upper phase arm 7, or first phase arm, is the part of the phase connected between the positive pole 4a and an ac phase output 10, while the lower phase arm 8, or second phase arm, is the part of the phase connected between the negative pole 4b and the ac phase output 10. The ground point 5 is located so that the potential $U_{dp}$ is provided between the positive pole 4a and the ground point 5, and a potential $U_{dn}$ is provided between the negative pole 4b and the ground point 5. If the voltage between the two poles 4a, 4b is denoted $U_d$, then typically $U_{dp}$ equals $U_d/2$ and $U_{dn}$ equals $-U_d/2$. The ac-side current is driven by the average voltage of the upper and lower phase arms 7, 8.

The illustrated phase of the converter 1 comprises a number of series-connected identical cells $2_1, \ldots, 2_n$. Each cell $2_1, \ldots, 2_n$ comprises a capacitor C parallel-connected with a switch pair. The voltage of a cell capacitor is denoted $u_{pi}$ and $u_{ni}$ for the capacitor of the i:th cell for the upper phase arm 7 and lower phase arm 8, respectively. The switch pair comprises two series-connected semiconductor devices 3a, 3b, which each in turn comprises a respective transistor T1, T2 with an anti-parallel connected diode D1, D2, or rather, in order to manage high voltages, each semiconductor device 3a, 3b may in fact comprise a number of series-connected transistors, having anti-parallel diodes connected thereto.

That is, each semiconductor device 3a, 3b comprises at least one transistor having one such anti-parallel diode connected thereto, or several series-connected transistors having several series-connected diodes connected thereto. Examples of the semiconductor devices 3a, 3b comprise Insulated Gate Bipolar Transistors (IGBTs), integrated gate commutated thyristors (IGCT), injection enhancement gate transistors (IEGT) and gate turn-off thyristors (GTO).

The converter 1 is controlled by means of a control device, schematically illustrated in the figure at reference numeral 6. The control device 6 comprises means 9 for implementing a method in accordance with the invention and to be described in more detail in the following.

Figure 3:
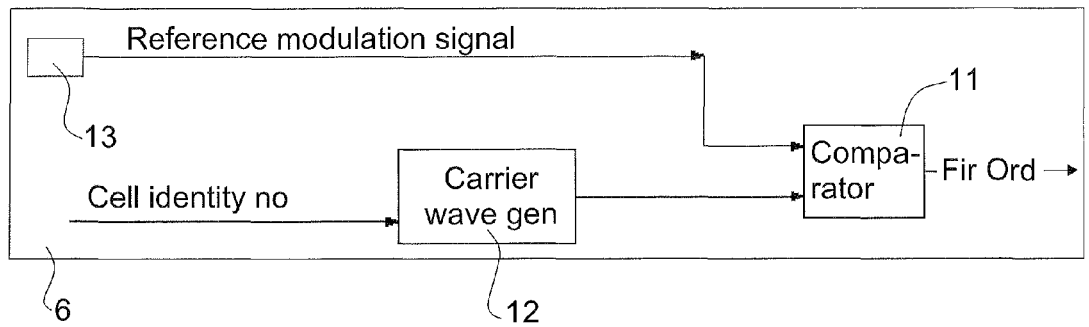
FIG. 3 illustrates schematically an ac current control function implemented in a control device controlling a converter.

FIG. 3 illustrates schematically an ac current control function implemented in the control device 6. The control of the cells $2_1, \ldots, 2_n$ and in particular its semiconductor devices 3a, 3b, should be aimed at providing as accurate a firing order for each cell, also denoted switching order, as possible. In particular, a desired reference modulation signal $v_v^{ref}$, preferably representing the fundamental frequency output voltage on the ac phase output 10, should be achieved and the firing orders should be optimized to this end. The desired reference modulation signal $u_v^{ref}$ is a voltage reference that corresponds to a desired ac current on the ac-side, i.e. provides the desired ac-side output.

The ac current control function 13 provides the reference modulation signal $u_v^{ref}$ to a comparator 11. As mentioned in the introductory part, it is desirable for the current control function 13 to be defined so as to make the converter 1 appear as a voltage source behind an inductance.

In conventional manner, a carrier wave generator 12 provides a carrier wave signal, for example having a triangle waveform. The carrier wave signal is input to the comparator 11, as is the reference modulation signal $u_v^{ref}$, whereby a pulse-width modulation (PWM) signal is provided. The PWM signal output from the comparator 11 determines whether or not a firing order should be sent to the cell $2_i$ in question, if having a high value then a firing order is sent. The invention is concerned with avoiding ripple voltage by providing an improved reference modulation signal $u_v^{ref}$ and any known PWM scheme can be utilized.

In conventional manner, the carrier wave signal is chosen so as to reflect actual network conditions. For example, the amplitude of the carrier wave signal can be made dependent on the direct voltage, and the frequency of the carrier wave signal can be set to be a multiple of the frequency of a desired reference voltage output.

Figure 4A:
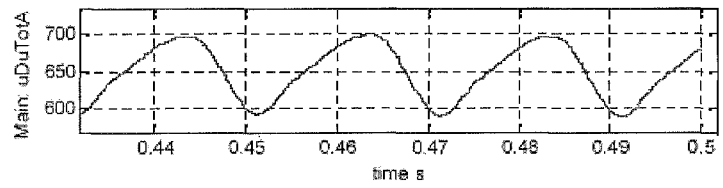
FIGS. 4a-4d illustrate typical results for the ripple on the total voltage of the cells in a converter.
Figure 4B:
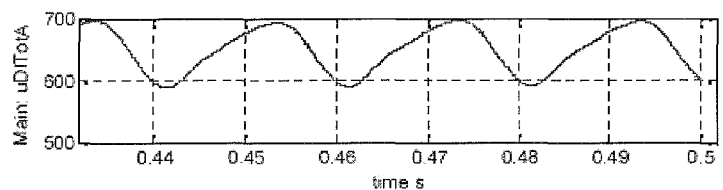
Figure 4C:
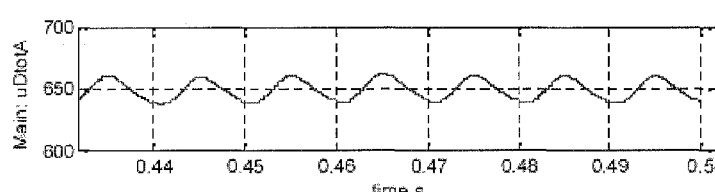
Figure 4D:
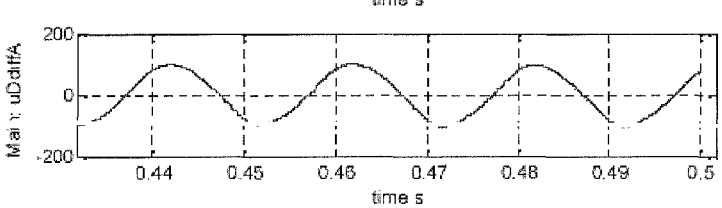

FIGS. 4a-4d illustrate typical results for the ripple on the total voltage of the cells $2_1, \ldots, 2_n$ in the converter 1. FIG. 4a illustrates the sum $u_{cp}$ of the cell voltages of the upper phase arm 7, FIG. 4b illustrates the sum $u_{cp}$ of the cell voltages of the lower phase arm 8, FIG. 4c illustrates the average $$\frac{u_{cp} + u_{cn}}{2}$$

of the sum of the cell voltages of the upper and lower phase arms 7, 8, and FIG. 4d finally illustrates the difference $u_{cp}-u_{cn}$ between the sum of the cell voltages of the upper and lower phase arms 7, 8.

By studying the behaviour of the ripple, the inventors of the present invention found a way of eliminating it. In particular, by compensating the reference modulation signal $u_v^{ref}$ used for the switching control based on measured cell voltages, non-idealism of the ac current control can be eliminated.

In accordance with the invention, the cell capacitor voltages are measured and the sum of each phase arm, and $u_{cp}$ and $u_{cn}$, respectively, is calculated. The following expression for defining the compensated voltage reference r was found to eliminate the undesired ripple voltage:

$$r = \frac{u_v^{ref} + (u_{cp} - u_{cn})/4}{(u_{cp} + u_{cn})/4} \quad \text{(eq. 1)}$$

where $u_v^{ref}$ is the reference modulation signal, which in turn preferably is the ideal voltage reference for obtaining the desired ac current. By using r as the actual voltage reference in the cell switching control, the voltage ripple, which is present in the cell voltages, can be eliminated from the resulting ac output voltage.

Figure 5:
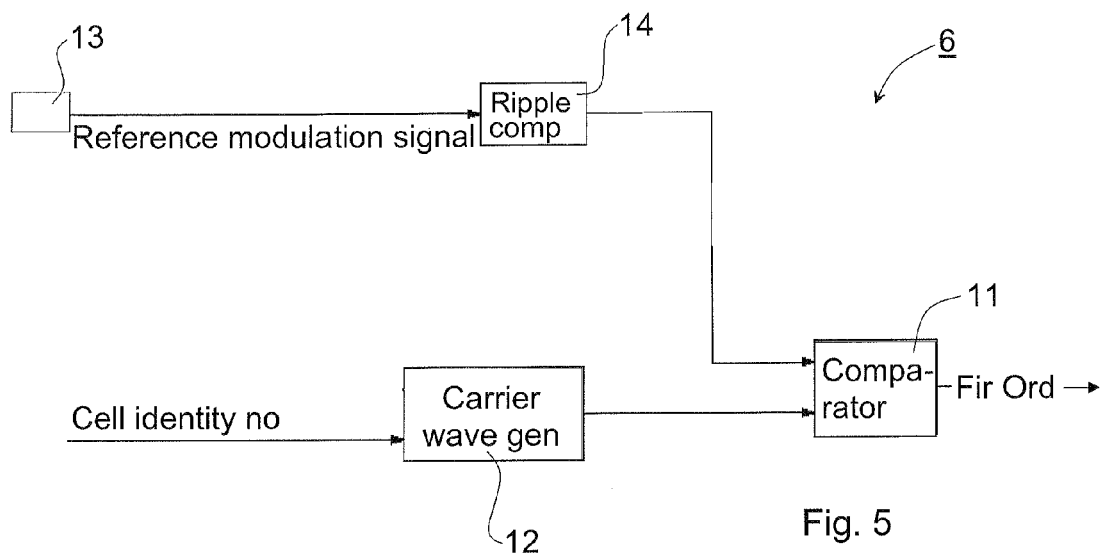
FIG. 5 illustrates a ripple compensation function in accordance with the invention.

With reference now to FIG. 5, in accordance with the invention a ripple compensation function 14 implementing the above equation is added to the control device 6. That is, the reference modulation signal $u_v^{ref}$ is modified in accordance with equation 1 and r is input to the comparator 11 instead of $u_v^{ref}$. A PWM signal is obtained in accordance with the process as described with reference to FIG. 3.

Figure 6:
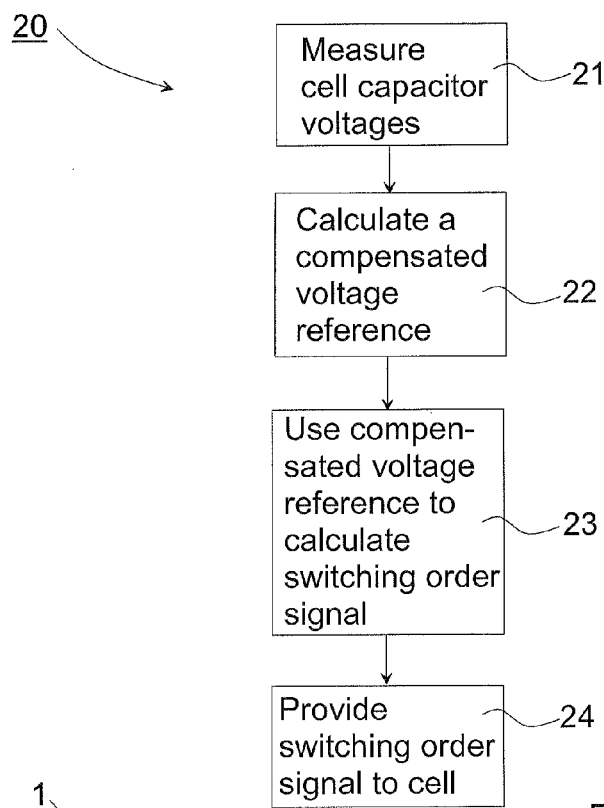
FIG. 6 illustrates a flow chart over steps of a method in accordance with the invention.

FIG. 6 illustrates a flow chart over steps included in a method for providing a switching order signal to cells $2_1, \ldots, 2_n$ of the above-described converter 1. The method 20 comprises the first step of measuring 21 voltages $u_{pi}, u_{ni}$ of the capacitors C of the cells $2_1, \ldots, 2_n$. The measurements can be performed in any suitable and known manner. In a second step, a compensated voltage reference r is calculated 22 based on a voltage reference $u_v^{ref}$ and the measured voltages $u_{pi}, u_{ni}$ of the capacitors C. The voltage reference $u_v^{ref}$ preferably corresponds to a desired ac current that is to be output on the ac-side. The method 20 comprises the further step of using 23 the compensated voltage reference r for calculating a switching order signal. Finally, the method comprises the step of providing 24 the switching order signal to the cells $2_1, \ldots, 2_n$.

In an embodiment, the step of calculating 21 the compensated voltage reference r comprises calculating the sum of the cell capacitor voltages $u_{cp}, u_{cn}$ of the upper and lower phase arms 7, 8. In particular, the sums are preferably used in accordance with the equation (eq. 1) given earlier.

In an embodiment, the step of calculating 23 the switching order signal is based on pulse-width modulating the compensated voltage reference r with a carrier wave signal. The pulse-width modulation can be performed in any known manner. The carrier wave signal chosen is typically chosen so as to reflect actual network conditions, as described earlier with reference to FIG. 3.

It is noted that additional steps may be added, and that some of the steps can be performed essentially simultaneously.

The invention also provides a control device 6 for controlling switching instants of the cells $2_1, \ldots, 2_n$ of the described converter 1. The control device 6 comprises means for implementing the above-described method, such means for example comprising software in e.g. a microprocessor.

It is noted that the described current control function may be implemented as software executed on a processing means, such as a computer or microprocessor.

Figure 7:
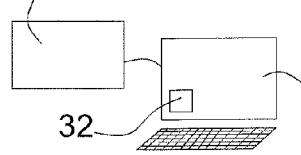
FIG. 7 illustrates a computer controlling the converter of FIG. 2.

Further yet, with reference to FIG. 7, the invention provides a computer program product 31 loadable into the internal memory of a computer 30 that controls a cascaded two-level converter, such as the converter 1. The computer program product 31 comprises software code portions for carrying out the method as described above, when it is run on the computer 30. The computer program product 31 can be stored on a computer readable storage medium 32 comprising computer readable program code means for causing the computer 30 of the converter 1 to carry out the method as described. The computer readable storage medium 32 could for example comprise a ROM (read-only memory), a PROM (programmable ROM), an EPROM (erasable PROM), a Flash memory, or an EEPROM (electrically EPROM).

The present invention provides an improved current control function, wherein the harmonic interaction between the cascaded two-level converter and the ac-side is minimized. The current control is closer to the desired one making the cascaded two-level converter appear as a voltage source behind an inductance. The output ac voltage is thus free from ripple voltage and equals the desired voltage reference.

The inventors of the present invention have performed a number of computer simulations providing promising predictions of possible improvements. The method has also been implemented and tested by real time measurements of an analogue circuit simulator, which gave excellent results.

The invention claimed is:

1. A method for providing a switching order signal to a cell of a cascaded two-level converter arranged to convert between alternating current and direct current, said cell comprising a capacitor parallel-connected with two series-connected semiconductor devices, which each in turn comprises at least one respective transistor with an anti-parallel connected diode, said cascaded two-level converter comprising at least two of said cells cascade connected and arranged in a phase between a first pole and a second pole of a direct voltage side, said phase being divided into two phase arms, a first phase arm being connected between said first pole and an ac phase output, and a second phase arm being arranged between said ac phase output and said second pole, comprising the steps of:

measuring voltages of said capacitors of said at least two cells;

calculating a compensated voltage reference based on a voltage reference and said measured voltages of said capacitors, said voltage reference representing the fundamental frequency output voltage on the ac phase output and corresponding to a desired ac current to be output on an ac-side;

using said compensated voltage reference to calculate a switching order signal for said cell; and providing said switching order signal to said cell, wherein said step of calculating a compensated voltage reference comprises utilizing the equation:

$$r = \frac{u_v^{ref} + (u_{cp} - u_{cn})/4}{(u_{cp} + u_{cn})/4},$$

wherein r is said compensated voltage reference, $u_v^{ref}$ is said voltage reference, $u_{cp}$ is the sum of the cell capacitor voltages of said first phase arm and $u_{cn}$ is the sum of the cell capacitor voltages of said second phase arm.

2. The method as claimed in claim 1, wherein it is performed for each of said at least two cells said step of using said compensated voltage reference to calculate a switching order signal for the respective cell and of providing said switching order signal to the respective cell.

3. The method as claimed in claim 1, wherein said step of calculating a compensated voltage reference comprises calculating the sum of the cell capacitor voltages of said first and second phase arms.

4. The method as claimed in claim 1, wherein said step of calculating the switching order signal is based on pulse-width modulation using a carrier wave signal.

5. The method as claimed in claim 4, wherein said carrier wave signal is chosen so as to reflect actual network conditions.

6. Control device for controlling switching instants of a cell of a cascaded two-level converter arranged to convert between alternating current and direct current, said cell comprising a capacitor parallel-connected with two series-connected semiconductor devices, which each in turn comprises at least one respective transistor with an anti-parallel connected diode, said cascaded two-level converter comprising at least two of said cells cascade connected and arranged in a phase between a first pole and a second pole of a direct voltage side, said phase being divided into two phase arms, a first phase arm being connected between said first pole and an ac phase output, and a second phase arm being arranged between said ac phase output and said second pole, including means for implementing the method as claimed in claim 1.

7. The control device as claimed in claim 6, wherein said means comprises a processing means, such as a computer or microprocessor.

8. A computer program product stored on a computer readable storage medium and loadable into the internal memory of a computer controlling a cascaded two-level converter, comprising software code portions for carrying out the method as claimed in claim 1 when said product is run on said computer.

9. The method as claimed in claim 2, wherein said step of calculating a compensated voltage reference comprises calculating the sum of the cell capacitor voltages of said first and second phase arms.

10. The method as claimed in claim 2, wherein said step of calculating the switching order signal is based on pulse-width modulation using a carrier wave signal.

11. The method as claimed in claim 3, wherein said step of calculating the switching order signal is based on pulse-width modulation using a carrier wave signal.

\* \* \* \* \*